(12) United States Patent
Zhang et al.

(10) Patent No.: US 8,817,693 B2
(45) Date of Patent: Aug. 26, 2014

(54) INTELLIGENT WI-FI PACKET RELAY PROTOCOL

(71) Applicant: The Florida State University Research Foundation, Inc., Tallahassee, FL (US)

(72) Inventors: Zhenghao Zhang, Tallahassee, FL (US); Shuaiyuan Zhou, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 14/085,393

(22) Filed: Nov. 20, 2013

(65) Prior Publication Data

US 2014/0140265 A1 May 22, 2014

Related U.S. Application Data

(60) Provisional application No. 61/728,281, filed on Nov. 20, 2012.

(51) Int. Cl.
*H04B 7/14* (2006.01)
*H04W 72/04* (2009.01)
*H04L 12/56* (2006.01)

(52) U.S. Cl.
CPC .................... *H04L 45/14* (2013.01); *H04W 72/04* (2013.01)
USPC .......................................... 370/315; 370/329

(58) Field of Classification Search
USPC ........................ 370/252, 255, 315, 331, 335
See application file for complete search history.

(56) References Cited

U.S. PATENT DOCUMENTS

| 7,330,457 | B2 * | 2/2008 | Panwar et al. ............... 370/338 |
| 7,761,050 | B2 * | 7/2010 | Fitton et al. ..................... 455/7 |
| 7,826,381 | B1 * | 11/2010 | Kastuar et al. ................ 370/242 |
| 7,961,637 | B2 * | 6/2011 | McBeath ........................ 370/252 |
| 8,264,972 | B2 * | 9/2012 | Joyner ........................... 370/250 |
| 8,310,952 | B2 * | 11/2012 | Hatley et al. .................. 370/252 |
| 8,611,271 | B2 * | 12/2013 | Erkip et al. .................... 370/315 |
| 2006/0056338 | A1 * | 3/2006 | Abe et al. ...................... 370/328 |
| 2006/0077942 | A1 * | 4/2006 | Panwar et al. ................ 370/338 |
| 2007/0224931 | A1 * | 9/2007 | Fitton et al. ..................... 455/7 |
| 2008/0137585 | A1 * | 6/2008 | Loyola et al. ................ 370/315 |
| 2008/0310447 | A1 * | 12/2008 | Bedrosian ..................... 370/468 |

OTHER PUBLICATIONS

Liu et al, "CoopMAC: A Cooperative MAC for Wireless LANs", IEEE Journal on Selected Areas in Communications, 340-354, Feb. 2007.*

(Continued)

*Primary Examiner* — Brian O'Connor
(74) *Attorney, Agent, or Firm* — David P. Hendricks; Smith & Hopen, P.A.

(57) ABSTRACT

L2Relay is a novel packet relay protocol for Wi-Fi networks that can improve the performance and extend the range of the network. A device running L2Relay is referred to as a relayer, which overhears the packet transmissions and retransmits a packet on behalf of the Access Point (AP) or the node if no acknowledgement is overheard. L2Relay is ubiquitously compatible with all Wi-Fi devices. L2Relay is designed to be a layer 2 solution that has direct control over many layer 2 functionalities such as carrier sense. Unique problems are solved in the design of L2Relay including link measurement, rate adaptation, and relayer selection. L2Relay was implemented in the OpenFWWF platform and compared against the baseline without a relayer as well as a commercial Wi-Fi range extender. The results show that L2Relay outperforms both compared schemes.

20 Claims, 6 Drawing Sheets

(56) References Cited

OTHER PUBLICATIONS

Broadcom WLAN chipset for 802.11abg, http://www.docstoc.com/docs/53462044/Broadcom-WLAN-Chipset-for-80211abg.
Netgear Universal Wi-Fi Range Extender WN3000RP-100NAS, http://www.netgear.com/home/products/wireless-range-extenders/wn3000rp.aspx. Accessed Nov. 20, 2013.
Bahl et al., Opportunistic use of client repeaters to improve performance of WLANs. IEEE/ACM Transactions on Networking. 2008. vol. 17 (No. 4): 1160-1171.
Lu et al., Design, implementation and evaluation of an efficient opportunistic retransmission protocol. ACM Mobicom. Beijing, China. 2009: 73-84.
Kim et al., A robust and cooperative MAC protocol for IEEE 802.11a wireless networks. Wireless Pers Commun. 2012. vol. 67: 689-705.
Hagelstein et al., An efficient opportunistic cooperative diversity protocol for IEEE 802.11 networks. International Wireless Communications and Mobile Computing Conference (IWCMC). Caen, France. 2010 :417-421.
Zhu and Cao. rDCF: A relay-enabled medium access control protocol for wireless ad hoc networks. IEEE Transactions on Mobile Computing. 2006. vol. 5 (No. 9): 1201-1214.
Zou et al., A relay-aided media access (RAMA) protocol in multirate wireless networks. IEEE Transactions on Vehicular Technology. 2006. vol. 55 (No. 5): 1657-1667.
Liu et al., CoopMAC: A cooperative MAC for wireless LANs. IEEE Journal on Selected Areas in Communications. 2007. vol. 25 (No. 2): 340-354.
Bicket, Bit-rate selection in wireless networks. PhD thesis. Massachusetts Institute of Technology. 2005: 1-50.
Halperin et al., Predictable 802.11 packet delivery from wireless channel measurements. ACM SIGCOMM. 2010: 159-170.
Judd et al., Efficient channel-aware rate adaptation in dynamic environments. ACM MobiSys. Breckenridge, Colorado. 2008. 118-131.
Sen et al., AccuRate: Constellation based rate estimation in wireless networks. USENIX NSDI. 2010.
Vutukuru et al., Cross-layer wireless bit rate adaptation. ACM SIGCOMM. Barcelona, Spain. 2009. vol. 39 (No. 4): 3-14.
Wong et al., Robust rate adaptation for 802.11 wireless networks. ACM MobiCom. Los Angeles, California. 2006: 146-157.
Han et al., Maranello: Practical partial packet recovery for 802.11. NSDI. 2010: 1-14.
Iperf, http://iperf.sourceforge.net/. Accessed Nov. 20, 2013.
Gringoli and Nava, Open FirmWare for WiFi networks: A UniBS NTW group project. http://www.ing.unibs.it/~openfwwf/. Accessed Nov. 20, 2013.
Bose and Foh, A practical path loss model for indoor WiFi positioning enhancement. ICICS. Singapore. 2007.
"Wireshark," http://www.wireshark.org/. Accessed Nov. 20, 2013.
"Gnu radio—gnu fsf project," http://www.gnu.org/software/gnuradio. Accessed Nov. 20, 2013.

* cited by examiner

INTELLIGENT WI-FI PACKET RELAY PROTOCOL

CROSS-REFERENCE TO RELATED APPLICATIONS

The present application claims priority to provisional U.S. Patent Application Ser. No. 61/728,281, filed on Nov. 20, 2012, titled "L2RELAY: AN INTELLEGENT LAYER 2 WI-FI PACKET RELAY PROTOCOL," which is hereby incorporated by reference in its entirety.

BACKGROUND OF THE INVENTION

1. Field of the Invention

This invention relates to novel packet relay protocol for Wi-Fi networks. More particularly, it relates to a layer 2 packet relay protocol (L2Relay) to improve the performance and extend the range of the network.

2. Description of the Prior Art

Wi-Fi has been widely adopted in homes and offices. One challenge that often arises is the range of the Wi-Fi network, because the Wi-Fi interfaces operate under strict transmission power limits such that nodes on the edge of the network often get degraded or even interrupted service.

This problem can be alleviated to a degree by commercial range extenders such as Netgear Universal Wi-Fi Range Extender WN3000RP-100NAS, which extend the range of the network by capturing and rebroadcasting the transmitted packets. However, it is known that the range extenders may reduce network throughput because the node may be close to the Access Point (AP) and may be able to receive from the AP directly such that the rebroadcasting of the packets is unnecessary. This problem may be further exacerbated, for example, when the range extender rebroadcasts the packets at a low rate due to poor channel conditions between the range extender and the node.

There are many academic research prototypes that rely on node cooperation to improve the network performance, such as PRO, Soft-Repeater, RCMAC, DAFMAC, rDCF, RAMA, and CoopMAC. While they run more intelligent algorithms and protocols than the commercial range extenders, they all require modifications to the nodes and the AP. For ordinary users, modifying the AP or the device drivers in their machines can be an intimidating task which limits the applicability of these technologies.

SUMMARY OF THE INVENTION

The long-standing but heretofore unfulfilled need for improvements in extending the range of the Wi-Fi network without sacrificing any performance while being extremely easy to install is now met by a new, useful, and non-obvious invention.

The present invention is a newly designed layer 2 packet relay protocol, called L2Relay. A device running L2Relay is referred to as a relayer, which overhears the packet transmissions and retransmits a packet on behalf of the AP or the node if no acknowledgement message (ACK) is overheard.

One aspect of various embodiments is that an L2Relay device runs an intelligent protocol that selectively repeats packets only when necessary, thus practically never degrades the network performance, in contrast to typical commercial range extenders that repeat all packets many of which may be unnecessary.

L2Relay is designed for ubiquitous compatibility without the need of any modification to the nodes and the AP; as a result, an L2Relay device can be easily installed by simply plugging into a wall outlet in any Wi-Fi network and bring immediate benefits, in contrast to the academic research prototypes that are difficult to install for ordinary users.

L2Relay has many other distinct features due to the requirement of not modifying the AP and the nodes, as well as due to the exploiting of the Layer 2 information. Because AP and the nodes cannot be modified, L2Relay devices have to make decisions based on their local observations in a distributed manner. As a result, L2Relay adopts unique solutions for link measurement, rate adaptation, and relayer selection, which are completely different from those in the academic prototypes. In addition, our solutions are novel because they are based on the Layer 2 information. In wireless networks, Layer 2 is the data link layer which handles issues such as medium access. The existing academic prototype solutions are implemented above the Layer 2, such that they suffer many restrictions and do not have access to much useful information such as the medium idle time. On the contrary, L2Relay functions within Layer 2 and has access to such information, which enables it to solve many problems very efficiently.

A prototype of L2Relay implemented in the OpenFWWF platform is compared against the baseline network without a relay device as well as a popular commercial Wi-Fi range extender. The results show that L2Relay achieves better performance than both compared schemes, which suggests that L2Relay is capable of adapting to the wireless channel conditions and taking appropriate actions.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

The present application is directed to systems and methods for packet relay in a network. An exemplary method may comprise allowing a relayer to monitor a communications channel between an access point and a node and overhear data packets sent by the access point to the node and acknowledgement messages sent by the node to the access point. The relayer may estimate a plurality of packet receive ratios based on the overheard data packets and the acknowledgement messages. The relayer may then be allowed to relay for the node based on the results of an algorithm that compares two or more of the plurality of packet receive ratios. The relayer may store the overheard data packets in a buffer within the relayer. The relayer may monitor whether the node sends the acknowledgement message after the access point sends the data packet to the node. When the relayer fails to detect the acknowledgement message sent by the node to the access point, the relayer may send the acknowledgment message to the access point and they relay the data packet stored in the buffer from the relayer to the node.

Various additional embodiments may comprise a computer readable medium encoded with computer executable instructions which, when executed by the computer cause the computer to perform the following steps. A relayer may be allowed to monitor a communications channel between an access point and a node and overhear data packets sent by the access point to the node and acknowledgement messages sent by the node to the access point. A plurality of packet receive ratios may be estimated based on the overheard data packets and the acknowledgement messages. The relayer may be allowed to relay for the node based on the results of an algorithm that compares two or more of the plurality of packet receive ratios. The overheard data packets may be stored in a buffer within the relayer. The relayer may monitor whether the node sends the acknowledgement message after the access point sends the data packet to the node. The relayer may then send the acknowledgement message to the access point from the relayer when the relayer fails to detect the acknowledgement message sent by the node to the access point, and then relay the data packet stored in the buffer from the relayer to the node.

Design of L2Relay

The operations on the downlink and the uplink are identical except reversing the roles of the AP and the nodes. The operations for the nodes are also identical. The foregoing description of the protocol focuses on the downlink and the operation of one node. However, one skilled in the art will recognize that the description applies equally to the uplink and the use of more than one node.

Notations

Figure 1:
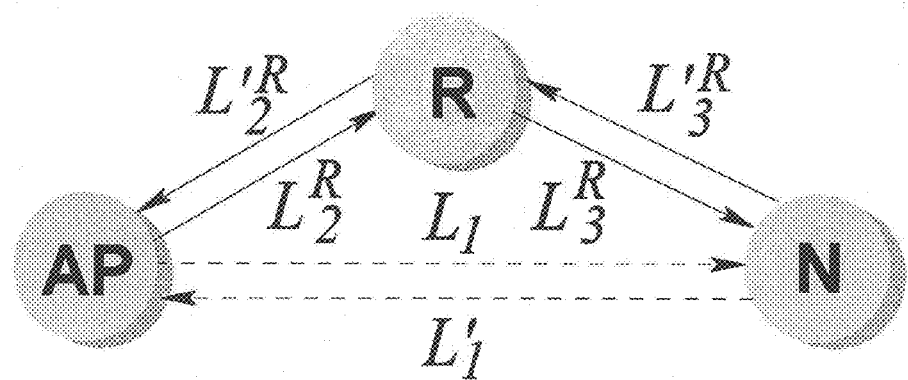
FIG. 1 depicts notations of links.

As used herein, R denotes a relayer and N to denote the node. R may or may not relay for N depending on the channel conditions; if it does, then R is the relayer of N or is relaying for N. As illustrated in FIG. 1, the link from the AP to N is denoted as $L_1$, the link from the AP to R is denoted as $L_2^R$, and the link from R to N is denoted as $L_3^R$. The reverse links are denoted as $L'_1$, $L'^R_2$, and $L'^R_3$, respectively. The Packet Receive Ratio (PRR) of a link is the fraction of packets that are received correctly, which is denoted as μ, along with the data rate, as PRR is related to the data rate. For example, the PRR of $L_2^R$ at rate ρ is denoted as $\mu_2^R[\rho]$. The PRR notation may be simplified if the link and the rate are clear from the context. The relay rank of R is denoted as $K_R$ and is calculated according to the PRRs where a better relayer has a smaller rank value.

Overview of Various Embodiments of L2Relay

At initialization, R is manually supplied with the MAC address of the AP it should serve. Then, R monitors the channel and maintains PRR records for N; the PRRs for different rates are stored separately. Whenever possible, R uses the overheard data packets and ACKs to estimate the PRRs which is referred to as the passive measurements; it may also use link probing to gather data for rates with no passive measurements. R makes decisions based on the PRRs; for example, if $\mu_1[\rho]$ is much larger than a $\mu_3^R[\rho]$ at some rate ρ, it should not relay for N. Suppose R is the relayer of N. After the AP sends a packet to N, R transmits the packet again if it does not detect the ACK from N. R runs a simple rate selection algorithm to adapt to the best rate for link $L_3^R$. R also periodically enters a rate exploration mode to force the AP to sample certain data rates in order to discover better data rates. To discover potential better relayers of N, R sends queries periodically to other relayers with a technique called ACK reflection. A better relayer Q may respond to the query and subsequently become the relayer of N.

Packet Relay Procedure

Various embodiments of the basic packet relay procedure are described as follows.

High Level Description

Figure 2:
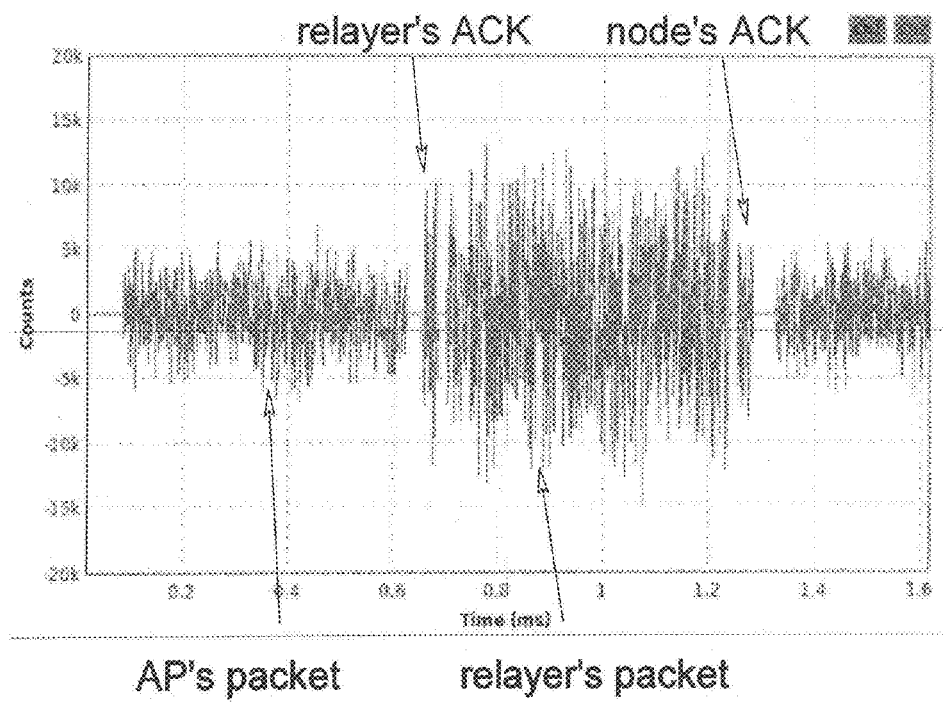
FIG. 2 depicts a typical packet transmission procedure.

Suppose R is the relayer of N. After the AP finishes sending a packet P to N, R will relay P if R received P correctly but did not detect the ACK from N for P. If R decides to relay P, it first sends an ACK to the AP on behalf of N such that the AP will not retransmit P. R then transmits P. After the transmission of P, if R receives the ACK from N, it removes P from the buffer; otherwise, it will attempt to retransmit P for up to another W−1 times, where W is set to be 3 in our current implementation, after which it removes P from the buffer. FIG. 2 shows a typical packet transmission procedure captured by the GNU Software Defined Radio.

Buffer Management and Packet Transmission:

R buffers only one packet in its buffer to keep the protocol simple. R writes an overheard packet to the buffer only if there is no packet in the buffer. The packet will be removed if an ACK from N has been received, or if the packet has been transmitted W times. When relaying a packet P for the first time, R transmits P short interframe space (SIFS, 10 μs in 802.11g) after its ACK to the AP. If P is still not received by N, the retransmissions are subject to the same random backoff procedure in 802.11 DCF.

ACK Detection:

R needs to detect if an ACK is sent by N to determine whether or not to relay P. This may seem straightforward because R may simply check if it has received the ACK. However, this means that R will have to wait until the ACK transmission will have been completed. This might have already been late because if N did not send the ACK, by this time, the AP may have already scheduled a retransmission, which basically defeats the purpose of using R for the retransmissions of lost packets. Therefore, L2Relay detects ACK by checking whether or not the medium is busy when the ACK is supposed to be transmitted, which can be carried out during the transmission of the ACK before the completion of the entire ACK. This is because the ACK should be sent SIFS after P while data packet transmission must wait for at least DCF Interframe space (DIFS, 28 μs in 802.11g) after P; therefore, if the medium is busy shortly after P, e.g., 15 μs after P, it is due to the ACK with high probability. The exact amount of time to wait before checking the medium depends on the hardware platform. In various embodiments, the amount of time to wait may be until at least part of the Physical Layer Convergence Procedure (PLCP) header of the ACK has been received, because various embodiments perform carrier sensing by receiving the PLCP header. If R decides to be the relayer of N, it can detect the ACK reliably with very low false negative ratio, because it must be able to communicate with N at a non-trivial data rate while carrier sensing is much more robust than data communication. False positive should also be rare, most likely due to non-Wi-Fi devices or interferences from other Wi-Fi networks; even when false positive occurs, R will just miss a relay opportunity and may relay next time. Experiments have been conducted which show that as long as R can at least communicate with N at the same rate N sends ACKs to the AP, the false negative and false positive ratios are very small, e.g., typically no more than 1-2%.

Relay Frame Modification:

R relays every MAC frame byte, except replacing the source address in the MAC header with its own MAC address because it needs to receive ACK from N to determine if a retransmission is needed Discussion on Loss Events Relay Procedure Against Packet Loss:

First, consider the situation when the AP sent a packet P and R received P correctly. There are two cases depending on whether N received P or not: 1) if not, N will not send ACK and R will relay the packet, which is the designed behavior of the protocol; 2) if yes, N will send ACK and if this ACK is detected by R, R will be silent according to the protocol, otherwise it will relay the packet, which is not necessary. We can see that the only problematic case is when both N and R received P correctly but R failed to detect the ACK from N. This is a rare event, because as explained earlier, ACK should be detected reliably if R is a good relayer N. In addition, the cost is bounded. When R missed the ACK from N, it will first send ACK to the AP, then attempt to relay P. The ACK from R will collide with the ACK from N, and the AP may receive neither of the ACKs. Therefore, the cost is no more than the AP's retransmission of P to N plus R's transmission of P to N. The cost is bounded because the AP and R have retransmission limits. The AP and R may get ACK from N and stop before reaching their retransmission limits, because their transmissions are unlikely to collide due to the random back-off mechanism. The second case occurs when the AP sent a packet P but R did not receive P correctly. That this should not happen very often because R should be able to receive most packets from the AP if it can serve as a relayer of N. Not having received P correctly, R will be silent after the AP's transmission, but can get involved in the next packet transmission according to the protocol, either when the next transmission is a new packet or is a retransmission of P. Therefore, the protocol can function properly in the presence of packet loss. In addition, the relayer may introduce packet duplications. However, packet duplication may occur even without the relayer, e.g., due to the unnecessary retransmission of the AP, and the upper layers are able to handle the duplications.

Relay Rate Selection

If R is the relayer of N, R should adapt to the best data rate to N. Any appropriate algorithm may be used. In various embodiments, L2Relay may use the SampleRate algorithm. Basically, R maintains a current data rate, denoted as $\rho_r^{*,R}$, which is initially set to the minimum rate. R measures $\mu_3^R[\rho_r^{*,R}]$ and $\mu_3^R[\rho_r^{*,R}]$. A rate with smaller packet delivery time than $\rho_r^{*,y}$ under ideal PRR is called a candidate rate. Every 10 packets, R randomly selects a candidate rate as the rate for the first transmission of the packet to learn the PRR at this rate; the possible retransmissions are at $\rho_r^{*,elay}$, $\mu_r^{*,R}$ is updated if a candidate rate is better.

Link Quality Estimation

One key aspect of L2Relay is the estimation of link PRRs. R runs a link quality estimation module and keeps the estimated PRRs in a table which can be queried by other modules. Separate estimate is maintained for each data rate. The estimation is based on the assumption that R can detect the ACKs from N reliably; we also explain why this assumption will not lead to incorrect behaviors of the protocol.

Estimation with Passive Observations

R can passively observe the link and obtain estimations without sending any packet. In the following, the estimations for one generic data rate ρ are described because the estimation method is the same for all data rates. For simplicity, the rate and superscript are dropped in the notation of PRR. R can estimate $\mu_1$, $\mu'_1$, $\mu_2$, and $\mu'_3$ with passive observations; if it has no additional information, it assumes $\mu'_2 = \mu_2$ and $\mu_3 = \mu'_3$.

The Following Set of Counters are Maintained:

$C_{hP}$: incremented by 1 whenever R receives the PLCP header of P correctly and the MAC header of P indicates the packet is from the AP.

$C_P$: incremented by 1 whenever R receives P correctly.

$C_{PA}$: incremented by 1 whenever R receives P correctly and detects the subsequent ACK from N.

$C_{PAP}$: incremented by 1 whenever R receives P correctly and detects the subsequent ACK from N, then receives P again with the same sequence number. The second transmission need not be at the same data rate as the first.

$C_{PA \wedge A}$: incremented by 1 whenever R receives P correctly and detects the subsequent ACK from N, but fails to receive the ACK correctly.

Every 1 second, R calculates the PRRs according to the values of the counters, which are regarded as new samples of the PRRs. The PRRs are then smoothed according to the standard Exponential Weighted Moving Average (EWMA) with a coefficient of 0.5 for the new sample. If a counter serving as the denominator in an equation is too small, the sample is not valid and the PRR is not updated. If no sample is valid in the last 10 seconds, the PRR value is set to be invalid. After the update, the counters are cleared.

R estimates $\mu_1$ by $$\mu_1 = \frac{C_{PA}}{C_P} \tag{1}$$

based on the definition of $\mu_1$. This estimation is accurate if R can detect the ACK from N reliably.

R estimates $\mu'_1$ by $$\mu'_1 = 1 - \frac{C_{PAP}}{C_{PA}}, \tag{2}$$

because $C_{PAP}$ is the number of events when the AP missed the ACK given R has observed the ACK.

R estimates $\mu_2$ by $$\mu_2 = \frac{C_P}{C_{hP}}. \tag{3}$$

This would be an accurate measurement of $\mu_2$ if R can detect all packets from the AP and count them in $C_{hP}$. However, there are packets with corrupted PLCP headers and MAC headers which will not be counted in $C_{lh}$; therefore, $\mu_2$ may be overestimated. This estimation method may still be used because the amount of overestimation is likely to be small for operative links. R estimates $\mu'_3$ by $$\mu'_3 = 1 - \frac{C_{PA \wedge A}}{C_{PA}}. \tag{4}$$

It may be easier to detect the ACK than to receive the ACK. Equation 4 determines $\mu'_3$ based on the probability of not receiving the ACK correctly given an ACK has been detected.

One feature of the passive estimation is that the equations above are valid even when another relayer, denoted as Q, is relaying for N. This is because the estimation of $\mu_1$ and $\mu'_3$ depend only on the packet transmission from the AP and the subsequent ACK from N before any possible involvement from Q. R will not misinterpret an ACK from Q as an ACK from N based on the timing: the former is sent with some delay after SIFS while the latter is sent immediately after SIFS. The estimation of $\mu'_1$ depends on $C_{PAF}$; still, Q should be able to detect the ACK from N and will not relay this packet Estimation with Link Probing R may also send probes to learn the qualities of $L_2^R$ and $L_3^R$, because the passive observations can be insufficient in certain cases. For example, if $\mu_1[\rho]$ is very small. R will not be able to estimate $\mu'_3{}^R[\rho]$ because few ACKs from N can be observed at rate $\rho$. R has to rely on the passive observations to estimate the quality of $L_1$; on the other hand, it can be more actively involved in estimating the links it shares with N and the AP, because correct choices of rates are critical to the network performance. As the probing process is the same to N and to the AP, in the following, only the probing to N is explained.

For simplicity, the purpose of the probing is to discover the optimal data rate for $L_3^R$, defined as the highest rate such that the PRR is above a threshold $\beta$, which is set as 0.8 in various embodiments. To limit the overhead, R should send probes infrequently, which is one beacon interval every 100 beacon intervals in various embodiments. During the probing beacon interval, R sends $\eta$ dummy packets at each selected rate to N, where $\eta$ is 20 in various embodiments. The dummy packets are of minimum size and are not retransmitted if no ACK is received. The optimal rate may be found by a binary search based on the assumption that the PRR is a non-increasing function of the data rate. To be more specific, the search starts by probing a rate in the middle. If its PRR is above $\beta$, all rates below the probed rate are marked off; otherwise, all rates above. The search then resumes on the remaining rates, until both PRRs above $\beta$ and PRRs below $\beta$ have been found. The passive observations can also be used to reduce the search space. That is, if the passive observations indicate low PRR at a certain rate, all higher rates can be marked off; similarly, if the passive observations indicate high PRR at a certain rate, all lower rates can be marked off.

R uses the following counters for each rate (again dropping the superscript and the rate in the subscript for simplicity):

$C_{rP}$: incremented by 1 whenever R sends a dummy packet.

$C_{rPA}$: incremented by 1 whenever R sends a dummy packet and detects the subsequent ACK from N.

$C_{rPA \wedge A}$: incremented by 1 whenever R sends a dummy packet and detects the subsequent ACK from N, but fails to receive the ACK correctly.

R estimate $\mu_3$ by $$\mu_3 = \frac{C_{rPA}}{C_{rP}}. \quad (5)$$

R estimate $\mu'_3$ by $$\mu'_3 = 1 - \frac{C_{rPA \wedge A}}{C_{rPA}}. \quad (6)$$

When R receives the next beacon packet from the AP, it calculates the PRR values for the rates with measurements collected from link probing, and replaces the old PRR values for such rates, after which the counters are cleared. This is because the PRRs calculated with link probing are mostly for the rates with no passive observations and the old PRRs are most likely collected at least 100 beacon intervals earlier.

Estimation when Relaying

When R is actively relaying for N, it can get more frequent observations. For simplicity, the operations are described for one generic data rate $\rho$ and the rate subscript and the superscript are dropped. R can estimate $\mu_3$ and $\mu'_3$ in a similar manner as in link probing. In addition, it can get a more accurate estimate for $\mu'_2$. It maintains counters:

$C_{rA}$: incremented by 1 whenever R sends an ACK.

$C_{rAPrx}$: incremented by 1 whenever R receives a retransmission packet from the AP after sending out an ACK.

It calculates $$\mu'_2 = 1 - \frac{C_{rAPrx}}{C_{rA}}. \quad (7)$$

R updates $\mu'_2$, $\mu_3$, and $\mu'_3$ every second according to EWMA with a coefficient of 0.5 for the new sample, after which the counters are cleared. No update is made if the new sample is not valid. A PRR is cleared if no sample is received in 10 seconds.

If R Cannot Detect the ACK from N

As mentioned earlier, the estimation of PRR is based on the assumption that R can detect the ACKs from N reliably. If this is not true, certain PRR values will be incorrect. For example, $C_{PA}$ will be smaller than the actual number of packets received by N such that $\mu_1$ will be underestimated according to Eq. 1. Fortunately, in this case, the channel between R and N must be very poor such that the estimated $\mu_3$ and $\mu'_3$ for any rate will be either invalid or very small. As a result, R will never consider itself a good relayer of N and the incorrect estimations of PRRs will not matter.

Expected Delivery Time Calculation

If the PRRs of all links are given. R can calculate $T_{\rho_a,\rho_r}$, which is the expected delivery time of a packet P of unit size when the AP and R transmit at rate $\rho_a$ and $\rho_r$, respectively. $T_{\rho_a,\rho_r}$ can be found based on a recursive relation. As the calculation module may have to be implemented in firmware, the complexity of the module may be limited by making the following simplifying assumptions:

If R receives P from the AP and sends an ACK, this ACK will be received by the AP. In practice, given that R just received P from the AP correctly, the channel is likely in a good condition such that the ACK will likely be received by the AP.

The receptions of other packet and ACK are independent.

R can always detect the ACK from N.

$T_{\rho_a,\rho_r}$ can be derived according to a case analysis:

Case 1: If neither N nor R receives P, the process is repeated.

Case 2: If N receives P, N will send ACK. Regardless of whether or not R receives P correctly, if R can always detect the ACK from N, it will not attempt to relay P. Depending on if the ACK is received by the AP:

If yes, one transmission is needed.

If not, the AP will retransmit and the process is repeated.

Case 3: If P is not received by N but by R, R will send the ACK and transmit P. According to the simplifying assumptions, the ACK from R will be received by the AP and one transmission is needed by the AP and $$\frac{1}{\mu_3[\rho_r]\mu'_3[\rho_r]}$$

transmissions are needed in expectation by R.

Therefore, $$T_{\rho_a,\rho_r} \approx (1-\mu_1[\rho_a])(1-\mu_2[\rho_a])\left(\frac{1}{\rho_a}+T_{\rho_a,\rho_r}\right)+$$

$$\frac{\mu_1[\rho_a]\mu'_1[\rho_a]}{\rho_a}+\mu_1[\rho_a](1-\mu'_1[\rho_a])\left(\frac{1}{\rho_a}+T_{\rho_a,\rho_r}\right)+$$

$$(1-\mu_1[\rho_a])\mu_2[\rho_a]\left(\frac{1}{\rho_a}+\frac{1}{\mu_3[\rho_r]\mu'_3[\rho_r]\rho_r}\right)$$

which can be simplified into Eq. 8:

$$T_{\rho_a,\rho_r} \approx \frac{\frac{1}{\rho_a}+\frac{(1-\mu_1[\rho_a])\mu_2[\rho_a]}{\mu_3[\rho_r]\mu'_3[\rho_r]\rho_r}}{\mu_2[\rho_a]+\mu_1[\rho_a]\mu'_1[\rho_a]-\mu_1[\rho_a]\mu_2[\rho_a]}. \quad (8)$$

Relayer Rank Calculation

R should know if it is a good relayer for N. The rank of R is denoted as $K_R$ and is basically the minimum expected air time used such that the AP can send a unit size packet to N with the help of R, where the minimization is taken over the possible data rates. R calculates its rank based on Eq. 8 by plugging in different rates. A simplification can be made because R should always use $\rho_r^{*,R}$, the best rate to node, as $\rho_r$ in Eq. 8. Therefore, the search is only over the possible rates the AP may use. R will not consider itself a candidate relayer if its rank is larger than the minimum packet delivery time for the AP without the help of R.

Rate Selection for the AP by the Relayer

Introducing a relayer to the network can affect the rate selection algorithm by the AP. For example, if R relays every packet of the AP, the AP will see a very good link and will continue to increase the data rate. As a result, N may not be able receive any packet from the AP directly, such that the link degrades into a two-hop path. The two-hop path may or may not be better than a single hop link that works partially. If R acts as the relayer, it has to make efforts to lead the AP to the better rates, because rate selection is critical to the network performance and only R has the full knowledge about the links.

Rate Exploration

Let $\hat{\rho}_a^{*,R}$ be the best rate of the AP known to R, which is calculated by R based on its PRR tables according to Eq. 8. R has two modes, namely the operating mode and the exploration mode. It is in the operating mode by default but will also periodically enter the exploration mode, set to be 1 second in every 10 seconds in various embodiments. The packet relay policies are:

Operating mode: Only relay packets at rates no higher than $\hat{\rho}_a^{*,R}$.

Exploration mode: Only relay retransmitted packets at rates no higher than $\hat{\rho}_a^{*,R}\mu_2^R[\hat{\rho}_a^{*,R}]\mu'_2^R[\hat{\rho}_a^{*,R}]$.

R does not relay packets at rates higher than $\hat{\rho}_a^{*,R}$ in the operating mode because this will lead the AP to selecting $\hat{\rho}_a^{*,R}$. The exploration mode is introduced to help R discover $\rho_a^{*,R}$, the actual optimal rate. If the PRRs at all rates for all links are available, $\rho_a^{*,R}$ must be $\hat{\rho}_a^{*,R}$. However, R may only have measurements for a subset of the rates, especially for the link from the AP to N, because the AP will most likely transmit at only a subset of the rates, while this subset may not include $\rho_a^{*,R}$. The key is to trigger the AP to probe as many rates as possible to get samples at more rates. A rate selection algorithm will typically sample rates higher than its primary data rate; therefore, the challenge is mainly how to get samples at lower data rates. In the exploration mode, as only retransmitted packets are relayed, the AP may see significant losses at all rates higher than the rate at which it can directly communicate with N; therefore, it may drop the rate and visit many data rates. This policy is simple to implement because R may just check the retransmission flag in the 802.11 header and the rate to determine whether or not to relay a packet. It will not lead to a disastrous performance drop because the retransmitted packets are still relayed.

Relayer Selection

In case multiple relays are deployed in the same network, the best relayer should act as the relayer of N. This section explains how the relayers coordinate between each other to achieve determine the best relayer.

High Level Description

The relayer of N is denoted as R. In various embodiments, every 1 second, R announces a query message containing its rank. If another relayer Q finds it has a better rank than R in the last 3 announcements, it will respond the query with its own rank. After a timeout, if R finds that it has received one or multiple responses to its query, it will find the best rank in the responses which, without loss of generality, supposedly is from Q. R will announce a message to let Q be the new relayer.

Reliable Communications with ACK-Reflection

A challenge in relayer selection is to ensure that the control messages such as the query and the query response are received reliably, even when the relayers may not be able to communicate with each other directly. This is achieved by ACK reflection, which is based on the fact that if R and Q are both potential relayers of N, they should at least be able to communicate with N reliably. As the same procedure is followed by all relayers, ACK reflection is explained as follows when R is sending the message.

R will send two small dummy data packets back to back to N at the lowest rate and the information is announced by modifying the source MAC addresses in the packets. According to 802.11, N will send an ACK after it has received any data packet correctly, echoing the source MAC address in the data packet. Therefore, when Q receives the ACKs, it can decode the information based on the MAC addresses in the ACKs. This approach is very reliable because the dummy packets are sent at the lowest rate and the triggered ACKs are also likely at the lowest rate. The overhead is small because the dummy packets are small.

With two packets, the MAC address field carries a total of 12 bytes, among which 6 bytes are used to specify the MAC address of N, 4 bytes the MAC address of R, and the remaining 2 bytes the message type and the rank of the relayer. The message types include query and query response, as well as relayer status announcement, which is used by a relayer to announce who is the relayer of N. We note that 4 bytes are sufficient to specify the MAC address of the relayer because the relayers are likely made by the same manufacturer sharing at least two bytes in their MAC addresses. The duration field in the dummy packets is set to a special value such that the duration field of the ACK is also a special value to simplify the detection of the ACK reflection messages.

Learning the Existence of N

It is unlikely that R is completely unaware of N while R is actually the best relayer. We note that R cannot receive any packet with the MAC address of N only if all such packets are at data rates too high to be received by R. If N does not have a relayer, i.e., communicates with the AP directly, R is not a good relayer. If N has a relayer Q, Q should enter rate exploration periodically and some downlink packets to N might be sent at lower data rates. If R cannot receive any such packets, the link between R and the AP is much worse than that between Q and the AP. In this case, if R is the better relayer, the link between R and N must be better than that between Q and N. However, N will transmit some uplink packets at least occasionally, and R should have learned about N from such packets.

Evaluations

The L2Relay protocol was implemented on the OpenFWWF platform in firmware. Evaluations were conducted both in emulated wireless channel conditions and real-world wireless channel conditions comparing against a commercial range extender.

Implementation

In the OpenFWWF platform, programs are written in assembly language and are loaded into the microprocessor in the BCM4306 card as the firmware. The program has control over carrier sense, microsecond level timing, and the access to many physical layer parameters.

Evaluation in Emulated Environments

The first set of evaluations was based on emulated wireless channels. A packet dropping module which drops the packets and ACKs according to the emulated channel conditions was installed. The advantage of emulation-based evaluation is that the channel is repeatable and theoretically predictable. Real wireless channels are subject to random changes caused by interference and fading, such that it is often difficult to validate the internal designs of the protocol.

In the emulation, the AP, the node, and the relayers were set to be physically very close to each other such that natural packet losses were rare and most losses were introduced by the dropping module. The PRRs of the links were determined by the emulated Signal to Noise Ratio (SNR) and the SNR to PRR table of the BCM4306 card. The SNR was determined by the distance in the emulated environment between the sender and the receiver; to be specific, if the distance is d measured inmeters, the received signal strength was assumed to be $$-31 - 30 \log_{10} d$$

measured in dBm.

L2Relay was compared with two other schemes: 1) Baseline, which had only the AP and the node, and 2) Emulated Range Extender (EmuRExt), in which an emulated range extender was deployed in addition to the AP and the node. EmuRExt was also implemented in the OpenFWWF platform and emulated the behavior of typical range extenders which repeat every packet. That is, whenever EmuRExt received a packet from the AP, it sent an ACK to the AP and relayed the packet SIFS after the ACK. The firmware of the node was modified such that it never sent ACK to the AP when running EmuRExt experiments. EmuRExt used the same algorithm as L2Relay for rate selection to the node.

All experiments involved one AP, one node, and one or three relayers on 802.1 g channel 3. The AP, the node, and the relayers were Dell 610 laptop computers with the BCM4306 card. The AP and the node ran the unmodified b43 driver with auto-rate enabled and slightly modified OpenFWWF firmware with the additional packet dropping module as described earlier. The relayer functioned in the firmware level and needed no driver support; the L2Relay firmware or the EmuRExt firmware was loaded to turn it into a L2Relay relayer or an EmuRExt relayer, along with the additional packet dropping module. The AP was always at the center of the emulated environment. The locations of the relayers and the node were randomly selected within 20 to 150 meters to the AP under certain addition constraint; to be more specific, random locations were selected first but the selections may be rejected and the process repeated until the constraint is satisfied. A separate machine was used as a sniffer to collect log files with TCPDump. The iperf tool was used to generate UDP traffic as well as reporting the link throughput values. All experiments ran for 40 seconds and the data was collected from 10 second to 40 second.

The performance of the schemes was first compared when there was only one EmuRExt or L2Relay relayer. In the experiments, the AP was at the center of the emulated environment, while the relayer and the node were at random locations under certain additional constraints depending on the experiment.

Figure 3:
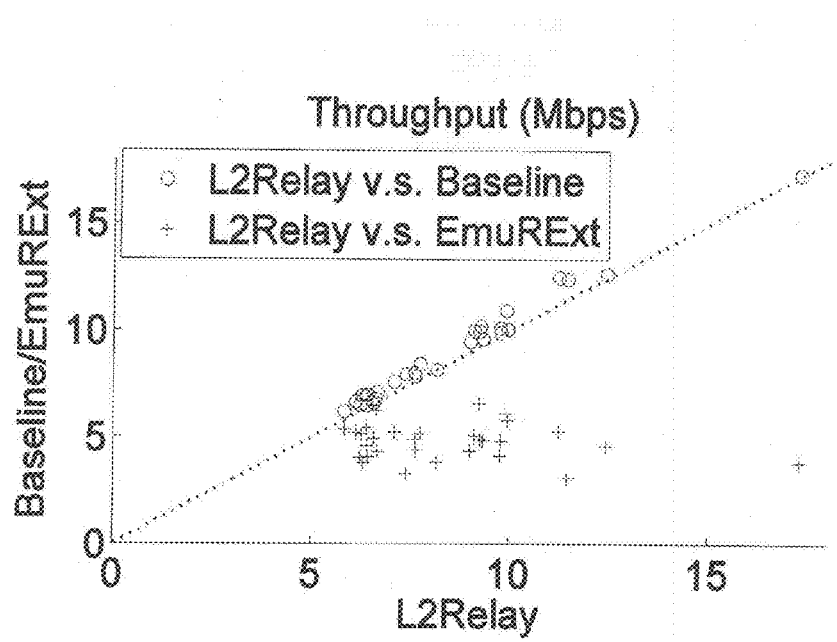
FIG. 3 depicts the throughput of the three schemes in a "one-hop" embodiment.

The first type of experiments was referred to as "one-hop," i.e., when there was no need to relay. The relayer and node locations were randomly chosen under the constraint that the node would not see improved performance with the addition of the L2Relay relayer. FIG. 3 shows the scatter plot of the throughput collected in 30 experiments. In the scatter plot, the x and y coordinates of a marker are the throughput values of L2Relay and the compared scheme in one experiment, respectively. L2Relay achieved almost identical performance as Baseline, which was the desired behavior because there was no need to relay packets in this case. EmuRExt suffered much worse performance because it mechanically rebroadcasted every packet; in some cases, it used a much lower rate than the rate of the AP and significantly reduced the throughput.

Figure 4:
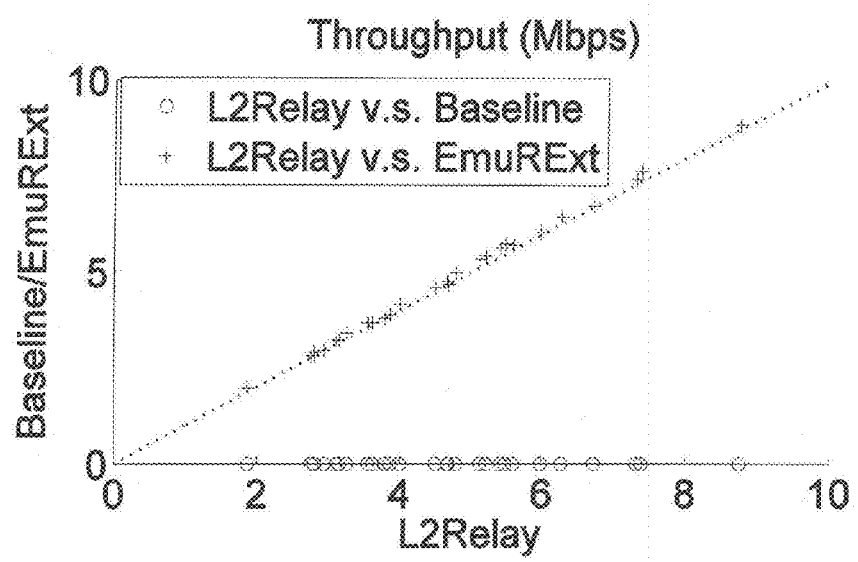
FIG. 4 depicts the throughput of the three schemes in "two-hop" embodiment.

The second type of experiments was referred to as "two-hop," i.e., when relay was absolutely needed, by choosing random relayer and node locations under the constraint that the node cannot communicate with the AP even at the lowest data rate. FIG. 4 shows the scatter plot of the throughput collected in 30 experiments. L2Relay achieved almost identical performance as EmuRExt, which was the desired behavior because EmuRExt is optimal in the two-hop setting. Baseline reported a throughput of 0.

Figure 5A:
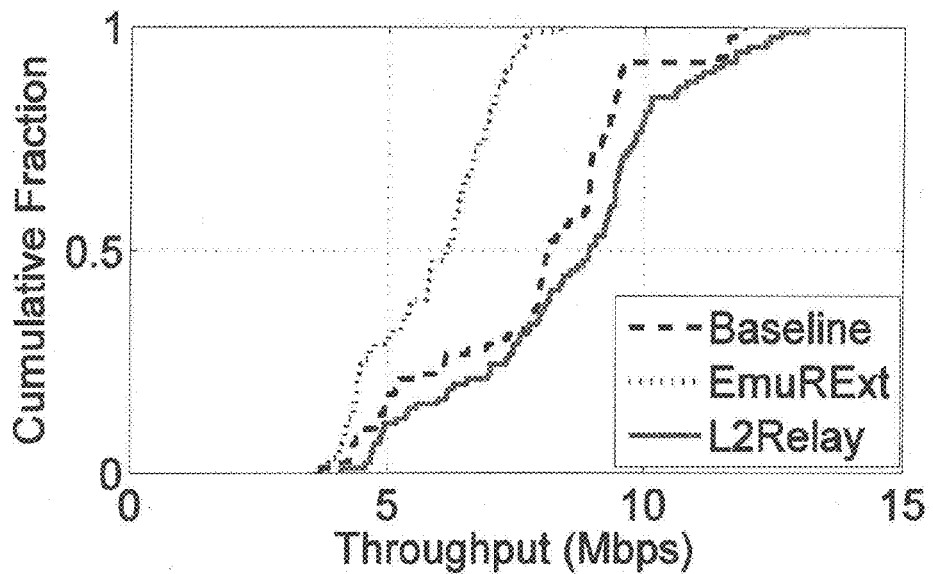
FIG. 5 depicts the cumulative fraction of the (a) throughput and (b) air time of the three schemes a "middle ground" case.
Figure 5B:
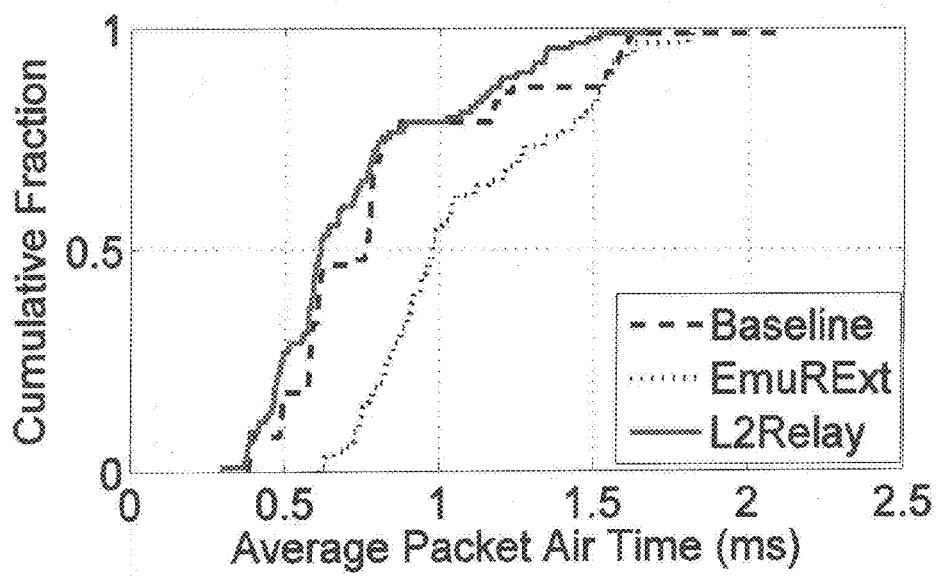

The third type of experiments was referred to as "middle-ground," i.e., the relayer and node locations were chosen under the constraint that the AP can communicate with the node directly while adding an L2Relay relayer will theoretically improve the throughput. FIG. 5(*a*) shows the Cumulative Density Function (CDF) of the throughput data collected in 90 experiments. L2Relay achieved noticeable throughput gains than the other two schemes. For example, the median throughput gain of L2Relay over Baseline and EmuRExt were 10% and 45%, respectively. The reasons for the throughput gain in middle-ground experiments are not as obvious as the other two cases. It may be because the AP may not need to retransmit a packet as the retransmission is handled more efficiently by the relayer which shares a better link with the node. It may also be because the AP may use higher data rates. The average air time consumption to deliver a packet based on the log file was measured, including the transmissions from both the AP and the relayer. FIG. 5(b) shows the CDF of the average packet air time data collected in the experiments. FIG. 5(b) verifies with FIG. 5(a) which confirms that the throughput gain was achieved by more efficient packet forwarding.

Figure 6:
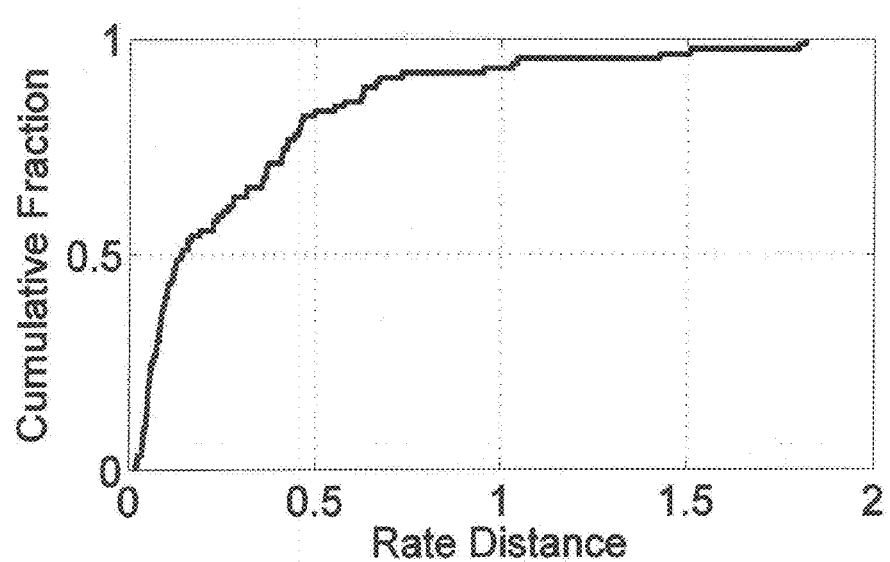
FIG. 6 depicts the rate distance.

A primary issue in L2Relay is the rate selection of the AP because the relayer should assist the AP to settle at a good rate even when the AP is completely unaware of the relayer. Rate i is denoted as $\rho_i$ where $1 \leq i \leq 8$ because there are 8 rates in 802.11g. The rate distance is defined as $\sum_{i=1}^{8} w_i |i-j|$, where $w_i$ is the fraction of packets sent at rate $\rho_i$ and $\rho_j$ is the optimal rate calculated according to the PRRs in the emulated environment. The rate distance is a metric of the rate selection; for example, a rate distance of 1 may mean that all packets are sent at a rate next to the optimal rate, and a rate distance of 0.5 may mean that half of the packets are sent at the optimal rate while the other half at a rate next to the optimal rate. FIG. 6 shows the CDF of the rate distance in the middle-ground case, where it can be seen that rate distance was typically small with a median of around 0.15, which means that the AP used the optimal rate or rates close to the optimal rate in the majority of the cases.

Figure 7A:
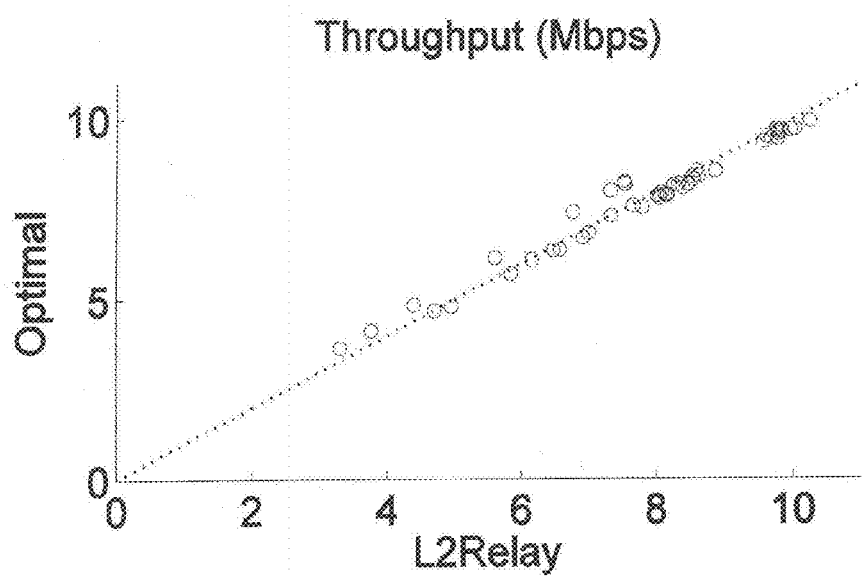
FIG. 7(a) depicts throughput for relayer selection.
Figure 7B:
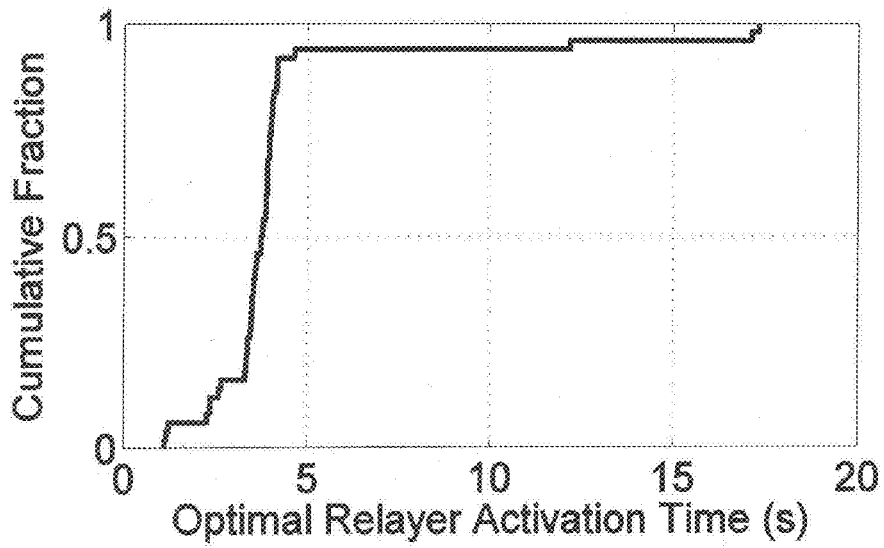
FIG. 7(b) depicts the cumulative fraction of the time the optimal relayer is activated.

Separate experiments were conducted to test relayer selection which is also a primary aspect of L2Relay. As before, the AP was at the center of the emulated environment. Three L2Relay relayers were randomly located on two circles corresponding to maximum communication speeds at 36 Mbps and 24 Mbps, respectively. The location of the node was randomly selected under the constraint that at least one of the relayers may act as the relayer of the node. A total of 50 sets of experiments were conducted, where each set contained two types of experiments, referred to as "L2Relay" and "Optimal." In L2Relay, all 3 relayers were turned on; in Optimal, only the optimal relayer calculated according to the PRRs in the emulated environment was turned on. To evaluate the speed the optimal relayer captured the relayer role, in the L2Relay case, the optimal relayer was turned on 5 seconds after other relayers. FIG. 7(a) shows the scatter plot of the throughput, where it can be seen that the throughputs of L2Relay and Optimal were almost identical, which confirms that L2Relay was capable of converging to a good relayer in most cases. In all experiments, it was found that the optimal relayer eventually became the relayer of the node and stayed as the relayer of the node afterwards till the end of the experiment. FIG. 7(b) shows the CDF of the activation time of the optimal relayer, defined as the time since the optimal relayer was turned on to the time it became the relayer of the node. The activation time was reasonably fast with a median of around 4 seconds.

Evaluation in Real-World Environments

Experiments were also conducted in real-world environments comparing head-to-head with the Netgear extender (WN3000RP-100NAS). A total of 15 network topologies were experimented, where each topology had one AP, 4 nodes, 3 L2Relay relayers, and one Netgear extender. In each topology, there were both nodes close to the AP and far from the AP; the L2Relay relayers and the Netgear extender were typically in the middle range. Only one Netgear extender was used because only one can be deployed in a network.

For each topology, we conducted the "one-to-one" experiments in which the AP ran only one iperf session and transmitted to only one node, as well as the "one-to-many" experiments in which the AP ran 4 iperf sessions and transmitted to all 4 nodes. "Baseline" refers to experiments where only the AP and the node(s) were turned on. The use of "Netgear" refers to the experiments in which the Netgear extender was turned on in addition to the AP and the node(s). To make the experiments impartial, the experiments were attempted three times, placing the Netgear extender at the same location as each of the L2Relay relayers. For one-to-one experiments, the node throughput was simply the highest among the three attempts. For one-to-many experiments, the node throughput was the one from the attempt with the highest aggregate throughput. "L2Relay" refers to the experiments in which all 3 L2Relay relayers were turned on in addition to the AP and the node(s).

Figure 8A:
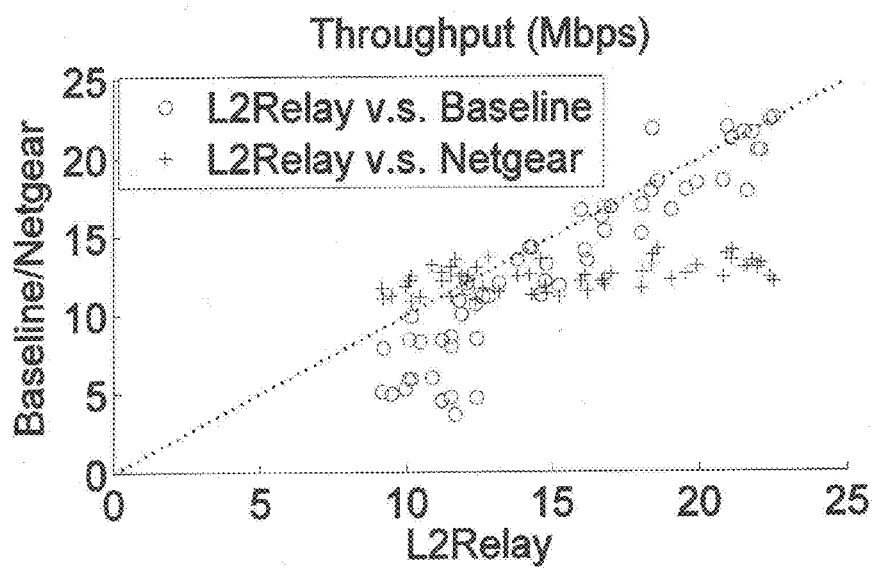
FIG. 8 depicts the throughput of L2Relay and a commercial range extender in the (a) one-to-one case, and (b) the one-to-many case.

FIG. 8(a) shows the scatter plot of the throughput in the one-to-one experiments. The comparison between L2Relay and Netgear may actually be biased against L2Relay, because the Netgear extender had better hardware such as a stronger antenna. Still, L2Relay achieved higher throughput than both Baseline and Netgear in most cases, which confirmed that L2Relay is effective in real-world environments. The throughput of Baseline was higher than Netgear in many cases when the nodes were close to the AP and did not need any packet repeating. The Netgear extender almost delivered the same throughput regardless of the location of the nodes, which was due to its static behavior of repeating every packet, as well as its strong hardware capable of supporting similarly high data rates to all nodes in the experiments.

Figure 8B:
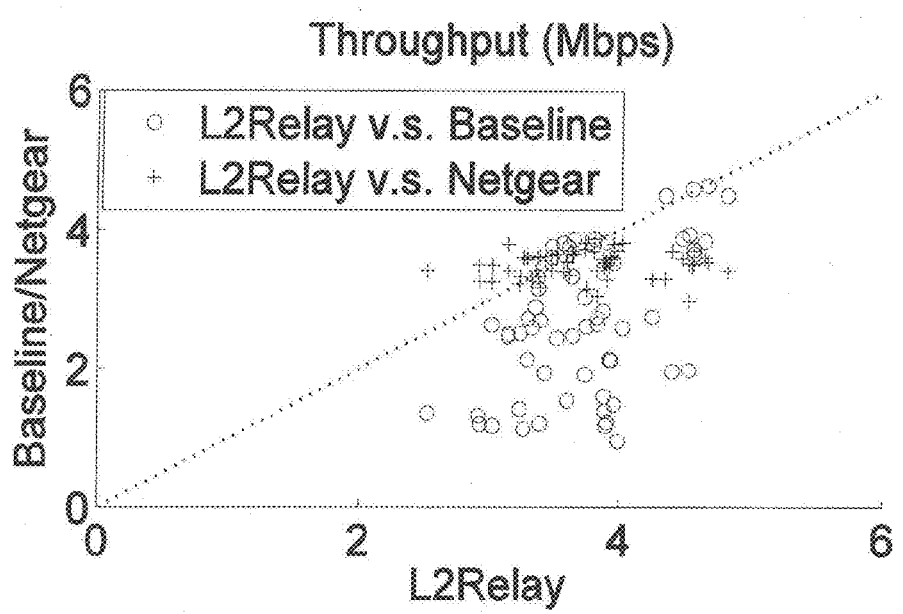

FIG. 8(b) shows the scatter plot of the throughput in the one-to-many experiments. L2Relay still outperformed both Baseline and Netgear in most cases, which confirmed that L2Relay was capable of supporting multiple nodes effectively. The gain over Netgear was not as impressive as in the one-to-one case because of the fate sharing in 802.11 networks; that is, a slow node may consume much of the air time with its traffic thus dragging down the performance of all other nodes. As explained earlier, the Netgear extender can deliver almost the same performance to all nodes, thus there were practically no slow nodes with Netgear. On the other hand, some nodes were slower with L2Relay than with Netgear due to the better hardware of Netgear, which negatively impacted the performance of all nodes. Also due to the fate sharing, Baseline saw a much weaker performance, because a slow node becomes even slower when deprived of the help from any relaying devices. Finally, the main purpose of the one-to-many experiments was to confirm the effectiveness of L2Relay in supporting multiple nodes; the fate sharing problem should be solved by better link bandwidth sharing algorithms which are out of the scope of these experiments.

In summary, a novel layer 2 packet relay protocol for Wi-Fi referred to as L2Relay is disclosed. An L2Relay relayer overhears a lost packet and retransmits the packet on behalf of the original sender when it is in a good position to relay the packet. L2Relay is designed to be ubiquitously compatible, i.e., one or multiple relayers can be easily installed in any network without any modification to the AP or the nodes. The features of L2Relay include passive and active link quality measurements, relayer rank calculation, rate adaptation, and distributed relayer selection. Various embodiments may exploit many layer 2 functionalities such as carrier sense and microsecond level timing. L2Relay was implemented in the OpenFWWF platform and compared against the baseline without a relayer as well as a commercial Wi-Fi range extender. Experimental results showed that L2Relay outperforms both compared schemes.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

Hardware and Software Infrastructure Examples

The present invention may be embodied on various computing platforms that perform actions responsive to software-based instructions. In various embodiments, a non-transitory computer readable medium may be encoded with computer executable instructions which, when executed by the computer cause the computer to a number of steps. These steps may comprise activating one or more relayers to monitor a communications channel between an access point and a node and overhear data packets sent by the access point to the node and acknowledgement messages sent by the node to the access point. A plurality of packet receive ratios may be estimated based on the overheard data packets and the acknowledgement messages. Communications may occur between the one or more relayers, and one of the relayers may be selected to relay for the node based on the results of an algorithm that compares two or more of the plurality of packet receive ratios. The overheard data packets may be stored in a buffer within the selected relayer. Whether the node sends the acknowledgement message after the access point sends the data packet to the node may be monitored. The acknowledgement message may be sent to the access point from the selected relayer when the selected relayer fails to detect the acknowledgement message sent by the node to the access point, and may then relay the data packet stored in the buffer from the selected relayer to the node. The access point may be triggered to broadcast using a plurality of data rates and determine the highest data rate for each of the one or more relayers. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language, assembly language, or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

GLOSSARY OF CLAIMS TERMS

Access point (AP): a device in a computer network that allows wireless devices to connect to a wired network using Wi-Fi or another standard. The AP may connect to a router (via a wired network) as a standalone device, but it can also be an integral component of the router itself. The AP may send data packets to a node.

Acknowledgement (ACK): A signal passed between devices in a computer network to signify acknowledgement, or receipt of transmission, as part of a communications protocol.

Beacon interval: The frequency interval of the beacon. The beacon is a packet broadcast by the AP to synchronize a wireless network.

Downlink: A communications link in a computer network from the access point to the node.

DCF interframe space (DIFS): The time interval that the AP must sense that the node is continuously idle before being permitted to transmit a data packet.

IEEE 802.11 standards: Standards and specifications for implementing wireless local area network computer communications.

Layer 2: The data link layer in the 7-layer OSI model of computer networking.

Network: A telecommunications network that allows computers and other devices to exchange data over a communications link.

Node: A terminating device in a communications link in a computer network.

Overhear or overheard: Reception of a packet transmission in a computer network by a device other than the intended recipient.

Packet: A discrete amount of data transferred over a communications link is a computer network. Larger data transmissions are broken up into a plurality of packets for transfer over the network.

Packet receive ratio (PRR): The fraction of packets that are received correctly over a communications link in a computer network.

Packet relay protocol (PRP): A standardized communication system for transferring packets over a communications link in a computer network.

Relay rank: A computed value for assessing the performance of a given relay in computer network that takes into account the packet receive ratio over that relay.

Relayer: A device capable of receiving and relaying signals sent over a communications link in a computer network between an access point and a node or another relayer.

Short interface space (SIFS): The time interval between the completion of sending a data packet by the AP and the sending of the acknowledgement by the node.

Uplink: A communications link in a computer network from the node to the access point.

It is also to be understood that the following claims are intended to cover all of the generic and specific features of the invention herein described, and all statements of the scope of the invention that, as a matter of language, might be said to fall therebetween.

What is claimed is:

1. A method for packet relay in a network, comprising:
    configuring a relayer to monitor a communications channel between an access point and a node and overhear data packets sent by the access point to the node and acknowledgement messages sent by the node to the access point;
    estimating, by the relayer, a plurality estimating a plurality of packet receive ratios based on the overheard data packets and the acknowledgement messages; and
    invoking the relayer to relay for the node based on the results of an algorithm that compares two or more of the plurality of packet receive ratios.

2. The method of claim 1, further comprising supplying the relayer with a MAC address for the access point.

3. The method of claim 1, wherein the plurality of packet receive ratios comprises at least the packet receive ratio between the access point and the node and the packet receive ratio between the relayer and the node.

4. The method of claim 1, wherein the relayer stores the overheard data packet in a buffer and the relayer monitors whether the node sends the acknowledgement message after the access point sends the data packet to the node.

5. The method of claim 4, wherein the relayer sends the acknowledgement message to the access point and relays the data packet to the node when the relayer fails to detect the acknowledgement message sent by the node to the access point.

6. The method of claim 4, wherein the relayer assumes the node has sent the acknowledgement message if the access point is busy at least 15 is after the access point sent the data packet.

7. The method of claim 4, wherein the relayer removes the data packet from the buffer when the relayer receives the acknowledgement message from the node.

8. The method of claim 1, wherein the packet receive ratios are estimated for a plurality of data transfer rates, and the relayer selects one of the data transfer rates to minimize packet delivery time.

9. The method of claim 1, wherein the relayer estimates the packet receive ratios using link probing in the absence of overheard data packets.

10. The method of claim 9, wherein the relayer periodically forces the access point to sample a variety of data rates.

11. The method of claim 1, wherein the communication is in accordance with IEEE 802.11 standards.

12. A method for packet relay in a network, comprising:
    configuring one or more relayers to monitor a communications channel between an access point and a node and overhear data packets sent by the access point to the node and acknowledgement messages sent by the node to the access point;
    estimating, by the one or more relayers, a plurality of packet receive ratios based on the overheard data packets and the acknowledgement messages;
    communicating between the one or more relayers and selecting one of the relayers to relay for the node based on the results of an algorithm that compares two or more of the plurality of packet receive ratios;
    storing the overheard data packets in a buffer within the selected relayer,
    monitoring whether the node sends the acknowledgement message after the access point sends the data packet to the node; and
    sending the acknowledgement message to the access point from the selected relayer when the selected relayer fails to detect the acknowledgement message sent by the node to the access point, and then relaying the data packet stored in the buffer from the selected relayer to the node.

13. The method of claim 12, wherein the plurality of packet receive ratios comprises at least the packet receive ratio between the access point and the node and the packet receive ratio between the selected relayer and the node.

14. The method of claim 12, wherein the selected relayer assumes the node has sent the acknowledgement message if the access point is busy at least 15 μs after the access point sent the data packet.

15. The method of claim 12, wherein the selected relayer removes the data packet from the buffer when the selected relayer receives the acknowledgement message from the node.

16. The method of claim 12, wherein the packet receive ratios are estimated for a plurality of data transfer rates, and the selected relayer selects one of the data transfer rates to minimize packet delivery time.

17. A system for packet relay within a network, comprising:
    an access point enabled to send data packets;
    a node enabled to receive data packets from the access point and send acknowledgement messages to the access point; and
    one or more relayers enabled to monitor a communications channel between the access point and the node and overhear the data packets sent by the access point to the node and the acknowledgement messages sent by the node to the access point;

wherein the one or more relayers are configured to estimate a plurality of packet receive ratios based on the overheard data packets and the acknowledgement messages, and allow selection of one of the relayers to relay for the node based on the results of an algorithm that compares two or more of the plurality of packet receive ratios.

18. The system of claim 17, wherein the relayer is further configured to compare at least the packet receive ratio between the access point and the node and the packet receive ratio between the relayer and the node.

19. The system of claim 17, wherein the selected relayer is further configured to send the acknowledgement message to the access point and relay the data packet to the node when the selected relayer fails to detect the acknowledgement message sent by the node to the access point.

20. The method of claim 17, wherein the packet receive ratios are estimated for a plurality of data transfer rates, and the selected relayer selects one of the data transfer rates to minimize packet delivery time.

\* \* \* \* \*

UNITED STATES PATENT AND TRADEMARK OFFICE
CERTIFICATE OF CORRECTION

| | | |
|---|---|---|
| PATENT NO. | : 8,817,693 B2 | Page 1 of 1 |
| APPLICATION NO. | : 14/085393 | |
| DATED | : August 26, 2014 | |
| INVENTOR(S) | : Zhenghao Zhang et al. | |

It is certified that error appears in the above-identified patent and that said Letters Patent is hereby corrected as shown below:

In the Claims

Column 17, Line 41, cancel the text beginning with "1. A method for packet" to and ending "packet received ratios." in column 17, line 52, and insert the following claim:

--1. A method for packet relay in a network, comprising:
    configuring a relayer to monitor a communications channel between an access point and a node and overhear data packets sent by the access point to the node and acknowledgement messages sent by the node to the access point:
    estimating, by the relayer, a plurality of packet receive ratios based on the overheard data packets and the acknowledgment messages; and
    invoking the relayer to relay for the node based on the results of an algorithm that compares two or more of the plurality of packet receive ratios.--

Column 18, Claim 6, Line 3, should read:

point is busy at least 15 μs after the access point sent the data

Signed and Sealed this
Eighteenth Day of November, 2014

Michelle K. Lee
*Deputy Director of the United States Patent and Trademark Office*